May 28, 1940. B. E. COHN 2,202,337
SEAL FOR EVACUATED VESSELS AND METHOD OF FORMING THE SAME
Filed Feb. 27, 1939

INVENTOR.
Byron E. Cohn.
BY Martin E. Anderson
ATTORNEY.

Patented May 28, 1940

2,202,337

UNITED STATES PATENT OFFICE 2,202,337

SEAL FOR EVACUATED VESSELS AND METHOD OF FORMING THE SAME

Byron E. Cohn, Denver, Colo.

Application February 27, 1939, Serial No. 258,747

2 Claims. (Cl. 49—81)

This invention relates to improvements in vacuum seals and methods for making the same.

It is frequently necessary to evacuate the interiors of vessels and seal the same, and this can be quite readily effected with glass and metal vessels as with such materials it is quite easy to make a gas tight seal because both kinds of materials are readily fusible and the metal can also be soldered.

It is sometimes desirable to make an evacuated container from ceramic material, such as porcelain. Such materials are highly refractory and it is not practical to employ the same method for effecting a seal as with glass.

It is the object of this invention to produce a vacuum seal that can be employed in connection with a vessel of ceramic material and a method for effecting a seal in a tube of such material.

This invention, briefly described, consists in constructing the vessel of ceramic material with a tube which may be connected to a vacuum pump in the same manner as is now commonly done with glass vessels.

In order to seal a porcelain or other highly refractory ceramic container in such a manner as to allow the interior thereof to maintain a high vacuum, the following method is followed:

The container is formed with an integral tube of relatively small cross section and so positioned and constructed that it may be heated externally, as, for example, by a flame. Where possible the tube may form some usable part of the container, such as the handle. Into the tube is inserted a plug, having a greater rate of increase of linear coefficient of expansion per unit rise in temperature than the tube and which must be of material that will fuse at a lower temperature than the material of the tube or which may be of highly refractory material having a surface layer of fusible material. The plug may also be made of refractory material and the tube may be lined with fusible material. After the plug has been put into position, the end of the tube is temporarily attached to a pump by means of which the evacuation is effected and the pressure in the container reduced to the amount desired. The tube is now heated to such a temperature that the fusible material mentioned above, fuses and forms a weld between the inside of the tube and the plug, thereby effectively sealing the tube against the entrance of gas. The pump is now detached and any further mechanical operations necessary to complete the container performed.

In the process of sealing off a porcelain vessel, or vessel of other ceramic material, which has been evacuated, any sealing which is accomplished by a metal or glass part attached to the outside of the vessel leaves the point of sealing exposed to breakage by jar or vibration. In addition the joint between the porcelain and metal, or glass, or other attachment is also exposed to breakage. Joints between vitreous bodies and other materials are usually mechanically weaker than a continuum of the vitreous material and therefore such external joints are a vulnerable point for breakage. It is evident that a method of sealing off in which the seal is effected entirely inside the porcelain or other vitreous member will protect the area of seal by reason of the surrounding vitreous shell.

To allow of such seals a certain difficulty in manipulation which is not encountered in the fabrication of external seals must be surmounted. To make the seal inside the porcelain tube the seal must be made without any external pinching off or pulling off of the seal. The rigid vitreous shell which protects the seal after it is made also prevents any mechanical interference with the seal to aid in its fabrication, as the vitreous shell is not softened at the temperature at which the seal is effected. The only mechanical operations which could be used to facilitate the sealing process would be a centrifugal force due to rotation of the tube and the action of gravity on the softened plug during the slow rotation of the tube. In the sealing off process in most cases rotation of the tube is restricted or prevented due to the manner of connection of the source of high vacuum to the porcelain and so the above mechanical aids are not available, and other means of insuring a successful seal becomes imperative. In the type of seal described in this application the problem is met by the selection of a sealing plug whose coefficient of expansion is greater than the vitreous tube in which it is to be sealed. The larger the difference in coefficient of expansion the more readily does the plug approach the walls of the vitreous tube in which the plug is confined, during the heating process. This relative increase in volume brings the plug into contact with the inner surface of the porcelain or other vitreous tube, there the action of capillary attraction and surface tension upon which adhesion depends allows the completion of the internal protected seal inside the rigid wall.

Having thus briefly described the invention and in order to more clearly define the same, reference will now be had to the accompanying drawing in which the apparatus and the several steps of the method have been illustrated, and in which.

Figure 1:
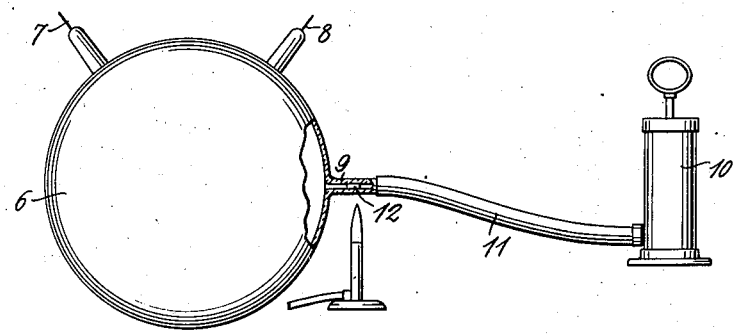
Figure 1 is a diagrammatic representation of the vessel to be evacuated and the other elements and apparatus employed in making the seal.

In the drawing reference numeral 6 designates a porcelain vessel of any kind and is intended to represent a mercury vapor device which has heretofore been frequently made of glass, but which for purposes where the light from the mercury vapor arc is not to be used, as for example, mercury vapor rectifiers, can be made more ruggedly from porcelain. Numerals 7 and 8 designate the terminals and reference numeral 9 represents the tube that communicates with the interior and through which the vessel is evacuated. An air pump 10 is connected with the tube by means of a hose 11.

Figure 2:
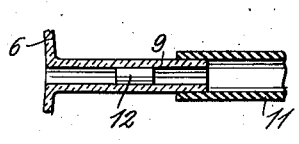
Figure 2 is a fragmentary section to a somewhat enlarged scale showing the fusible plug in place.
Figure 3:
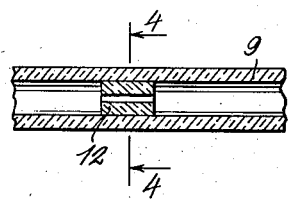
Figure 3 is another fragmentary section showing the plug and tube to a somewhat larger scale than in Figure 2.
Figure 4:
Figure 4 is a transverse section taken on line 4—4, Figure 3.

In Figure 2, the tube 9 has been shown to an enlarged scale as compared to Figure 1 and reference numeral 12 designates a short piece of capillary glass tubing of substantially the same outside diameter as the inside of the tube. The relationship of the tube 11 and the glass tube 12 is shown to a still further enlarged scale in Figures 3 and 4. The fusible plug must be of material having low vapor pressure at its softening temperature and minute vapor pressure at the temperature at which the vacuum vessel is to be used, its coefficient of linear expansion should also increase faster than that of the tube at high temperature. The softening temperature must be above 150 degrees C. and less than the softening temperature of the porcelain tube.

Figure 5:
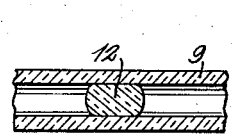
Figure 5 is a section similar to that of Figure 3 and shows the seal after the plug has been fused.

After the vessel has been evacuated to the desired degree of vacuum, a flame is directed onto the outside of the tube 9 at the point where the glass plug 12 is located, (Fig. 1) and the temperature of the tube is raised sufficiently to melt the glass which then tends to form a globule and assumes a shape somewhat like that shown in Figure 5. Owing to the greater linear coefficient of expansion and to the action of the surface tension which tends to give the molten glass a spherical shape, it is forced against and forms a weld with the inner surface of the tube and a perfect seal therefore results.

The inside of the tube 9 (Figs. 1 to 5 and Fig. 11) may be glazed if desired. The glaze melts at a lower temperature than the porcelain and therefore does not alter the physical properties of the latter. In this case also the seal is therefore effected by weld.

Although some glasses have characteristics well suited for a sealing plug, it is to be understood that other fusible materials may be used, such, for example, as a fusible inorganic substance or mixture, a fusible organic material or a fusible metal or alloy. Examples of each of the fusible materials which may be used as a plug for the purpose of sealing off a porcelain container are, Pyrex glass, silver chloride, synthetic or natural resins, and solder type alloys. In all cases the bond between the plug and the porcelain is formed by weld. The porcelain may be glazed or unglazed and the internal and external cross sections of the porcelain tube may have any suitable shape, but a circular cross section is preferable. The weld is in all cases formed inside of the tube by the action of heat applied to the outside thereof by any means.

It will be noted that all of the materials mentioned have greater coefficients of linear expansion than porcelain and therefore plugs made from them approach the wall of the tube during the heating operation. This is a departure from the commonly accepted postulate that sealing plugs for porcelain or ceramic tubes must have substantially the same coefficient of linear expansion as the material of the tube.

The position of the seal, inside of the tube, protects it from mechanical shock as well as from any external agents that would tend to disintegrate the bond.

In Figures 6 to 10 some minor modifications have been shown. As stated above, it is not essential that the whole plug shall be made of glass or of fusible material. It is possible to use a plug of porcelain, porous ware, refractory glass, alumina, a metal or any high melting ceramic material which fits loosely in the tube to be sealed, and to coat the inside of the tube or the outside of the plug, or impregnate the plug with a fusible material of lower melting point than the plug body itself. The plug and fusible material composite is inserted into the porcelain tube in the same manner as is explained in connection with plug 12 in Figure 2, and due to the greater rate of expansion with the temperature of the plug as a whole, its surface will approach the surface of the opening during the treating period.

Figure 7:
Figure 7 shows a modified form of plug.

When a refractory plug is employed, it is preferably constructed in the manner illustrated in Figure 7 from which it will be seen that the plug 12a is hour glass shaped and in the groove between the ends, a ring 13 of silver chloride, metal alloy, glass or a resin is positioned.

Figure 8:
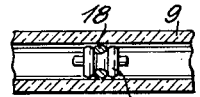
Figure 8 shows one of the modified plugs in position in the tube to be sealed.
Figure 9:
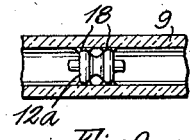
Figure 9 shows the plug after the sealing has been effected.

The plug 12a is inserted into a porcelain tube 9 in the manner shown in Figure 8. The plug is of such diameter that the distance between its outer surface and the inner surface of the tube is less than the width of the groove or the distance between the end humps and therefore when the tube is heated so as to melt the fusible material the action of the capillary force will pull the fusible material to the peripheries of the humps as indicated in Figure 9.

The fusible material 13 may be any of the materials previously mentioned or any other substance which, by the action of heat, is made fluid enough to wet the surfaces of both the plug and the porcelain tube and thereby effect a weld.

Figure 6:
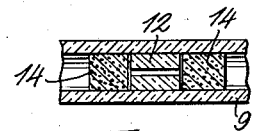
Figure 6 is a section similar to that shown in Figure 3, and shows the fusible plug anchored by means of porous ceramic plugs.

It is frequently desirable to anchor the plugs so as to prevent them from accidentally moving in the tube and this can be effected in various ways. In Figure 6 the fusible plug has been shown as positioned between two refractory porous ceramic plugs 14 that are held in place by suitable means. The refractory plugs restrict the flow of the fusible material. The barrier plugs 14 must be so porous that they do not inhibit the flow of air during the evacuation process to such an extent as to render it ineffective. The plugs 14 may be made of sintered glass or of porous ware or other suitable material.

Figure 10:
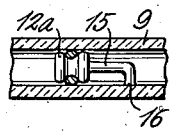
Figure 10 shows how the plug may be anchored to the tube.
Figure 11:
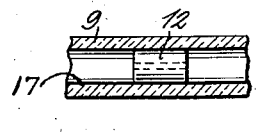
Figure 11 shows a refractory plug in a tube lined with fusible material.

In Figure 10 the plug has been illustrated as provided with an integral extension 15 that is anchored to the inside of the tube at 16.

The fusible material 15 may itself be a composite of fusible and nonfusible material such as silver chloride and fine powdered silica or sand.

Since the drawing is merely diagrammatic and is intended merely to facilitate an understanding of the invention, the size and the proportion of the parts as shown on the drawing are merely illustrative.

In the manner above described, it is possible to make various articles of porcelain that have heretofore been made of glass or metal, such as double walled tumblers, vacuum bottles, etc.

Although porcelain has been mentioned as the preferred material, it is to be understood that any kiln baked ceramic material may be used, even porous ware. In the latter case, however, the glaze must be depended upon to make the walls airtight. It is evident that the opening may be in the body of the article itself instead of in a tube, but the opening must be so positioned that its wall can be heated from the outside to effect a seal.

The essential difference between this method and previous ones is that whereas the prior methods stipulate that the coefficients of linear expansion of both sealing and sealed material are approximately alike, the operativeness of this process depends upon the fact that at higher temperatures the coefficient of expansion of the plug becomes greater than the coefficient of expansion of the tube in which it is contained. The greater expansion of the plug material, whether the plug is present as a simple cylinder or otherwise, results in a relatively greater increase in size of the plug material with temperature. This difference in expansion causes the plug to fill the tube and this effect in combination with the forces due to surface tension makes the process operative.

The use of a Pyrex glass cylinder as the plug material will be considered in detail. To indicate the difference in coefficient of expansion of Pyrex glass plug and porcelain tube, the following data are tabulated:

| Temperature | Mean coefficient (O to T) for porcelain $\times 10^{-6}$ | Coefficient porcelain at $T° \times 10^{-6}$ | Coefficient Pyrex at $T° \times 10^{-6}$ |
|---|---|---|---|
| 0° C | 3.03 | 3.03 | 3.2 |
| 250° C | 3.36 | 3.69 | 3.2 |
| 500° C | 3.68 | 4.33 | 5.5 |
| 525° C | 3.71 | 4.40 | 6.0 |
| 560° C | 3.76 | 4.49 | 15.0 |

These data are computed from values obtained from the following sources: International Critical Tables (McGraw-Hill) Vol. II, p. 78—from the computed mean coefficient for Berlin porcelain type, unglazed, is $(3.03 \div 0.0013\theta)10^{-6}$, the data are apparently those obtained by Henning, Ann. der. Phys. 22, 631 (1907) which agrees very well with the value computed by Holborn and Grüneisen and given in J. W. Mellor, A Comprehensive Treatise on Inorganic and Theoretical Chemistry (Longmans Green 1925) vol. 6, p. 516. Holborn and Grüneisen give $(3.027 \div 0.001177\theta)10^{-6}$.

The data for Pyrex glass are computed from the graph in an article by E. E. Burger, General Electric Review 37, 96 (1934); while the last figure is found in the 20th edition of the Handbook of Physics and Chemistry, p. 1199, the data originating in Peters and Cragoe, Bureau of Standards Scientific Paper No. 398, who give Pyrex glass coefficient, temperature range (21° C. to 471° C.) $=3.6 \times 10^{-6}$ temperature range (552° C. to 571° C.) $=15.1 \times 10^{-6}$ From the table it is evident that at temperatures above 500° C. and to 825° C. (the approximate softening temperature of the Pyrex plug) the expansion of the glass is so much greater than the porcelain that forces are set up which make the type of sealing described in this application operative without mechanical forming mechanism. It will be noted that already at 500° the linear coefficient of expansion for the Pyrex glass used is three times that of the porcelain.

The additional specifications to which the plug must conform are:

1. In the softened state its wall must wet the inside surface of the porcelain tube or the outside wall of the plug must be wet by a fusible glaze on the inside of the porcelain tube. The wetting of the surfaces is a fundamental condition necessary for a successful weld.

2. The average coefficient of expansion of the material of which the plug is made must not be so widely different from that of the porcelain that the effective value of the stresses thus created become greater than the tensile strength of the plug material or of the porcelain tube. By average coefficient of expansion in this statement is meant the mean value of the linear coefficient of expansion through the cooling range between the so-called "annealing point" and room temperature. The "annealing point" is defined as the temperature at or above which uncompensated stresses in the material become of negligible magnitude in less than fifteen minutes due to a viscous or internal yield without fracture of the material.

The values of the difference of coefficient of expansion between porcelain and plug which are allowable must necessarily depend upon relative diameters of cross section of porcelain and plug, upon the shape of the cross section should it not be circular, upon the magnitude of the temperature difference between the "annealing point" and room temperature, and upon the ability of the plug material or coating to deform (without breaking) at a stress lower than the tensile strength of the porcelain.

If the material of which the plug or its parts are composed can be mechanically deformed without breaking under the actions of the stresses set up by the difference between the coefficients of expansion of plug and porcelain the allowable difference of coefficients of expansion may become extremely large. For example, successful plug seals may be made with silver chloride as the plug coating agent. The average linear coefficient of expansion of silver chloride is given as $32\times10^{-6}$ whereas that of porcelain is approximately $3.5\times10^{-6}$. Here the inordinately large difference of coefficients is made possible by ease of the plastic deformation of the silver chloride bonding material. The reason may be stated in another manner, namely, that the annealing point for silver chloride is at a relatively low temperature, and therefore the effects of the difference in coefficients of expansion are not in evidence because the stresses developed are dissipated by the plastic deformation of the material.

In the case of glass plugs the glass chosen should have an average linear coefficient of expansion differing from that of porcelain by less than $4\times10^{-6}$ and preferably within $2\times10^{-6}$ per degree centigrade in the temperature range below the "annealing point." On the other hand, a large increase in relative volume of the glass between the "annealing point" and the softening temperature is of great usefulness in the plug sealing process.

In the case in which the material of the plug core is used to gain a higher coefficient of expansion than the coefficient of expansion of the porcelain boundary, the core should not have a coefficient of expansion greater than 40 per cent larger than the coefficient for the porcelain unless such core material is mechanically deformable under a stress less than the tensile strength of plug core, plug coating, or porcelain.

This application is a continuation in part of application Serial No. 169,780, filed October 19, 1937.

Having described the invention what is claimed as new is:

1. The method of forming an air-tight seal in a tube of ceramic material which comprises, inserting into the tube a composite plug of refractory, non-metallic material having a diameter slightly less than the internal diameter of the tube, the surface of the plug comprising a material of different composition than that of the plug and which surface is infusible below 150° C. and fusible at a temperature below the fusing point of the tube and the center portion of the plug, said material wetting the porcelain tube when fused, the composite plug having a coefficient of linear expansion whose average value in the cooling range below the "annealing point" is greater than that of the tube, but which does not exceed that of the tube by more than forty per cent., heating the tube by the external application of heat until the surface of the plug is brought into contact with the material of the tube and the fusible material melts and effects a weld with the material of the plug and tube, and then permitting the parts to cool.

2. An air-tight seal comprising a tube of highly refractory material, a composite plug having a core of refractory, non-metallic material and a surface layer of sealing material having a fusing temperature lower than said refractory material but not below 150° C. and which wets the core of the plug and the tube when fused, the composite plug having an average coefficient of linear expansion greater than that of the enclosing tube and which in the cooling range below the "annealing point" of the sealing material does not exceed that of the enclosing tube by more than forty per cent. whereby the surfaces of the composite plug and the tube will approach each other during the heating and welding step and whereby destructive strains are prevented during cooling.

BYRON E. COHN.